Aug. 14, 1928.
W. BAILEY
JOINT
Filed Nov. 11, 1927
1,681,081
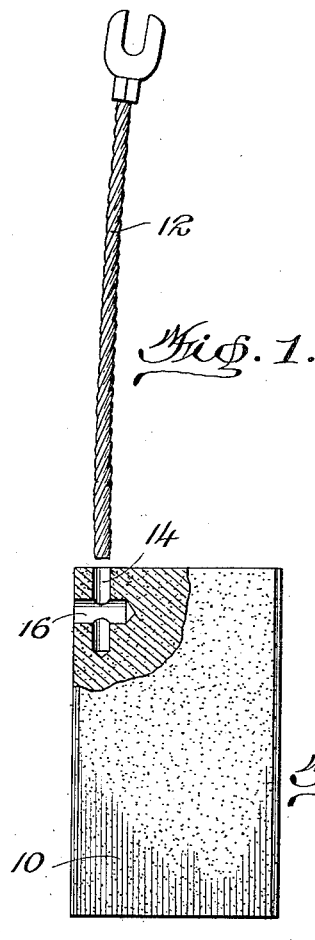
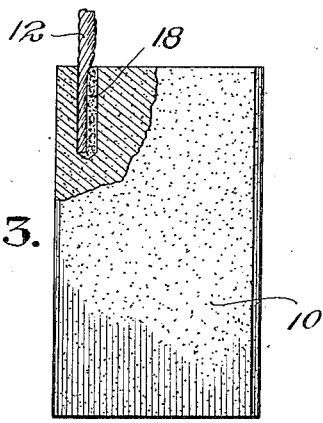
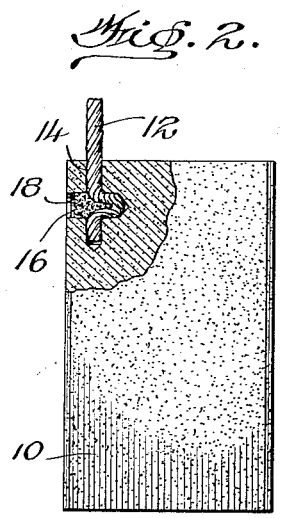
Inventor
Walter Bailey
by Bright & Bailey
Attorneys Patented Aug. 14, 1928.

1,681,081

UNITED STATES PATENT OFFICE.

WALTER BAILEY, OF WASHINGTON, DISTRICT OF COLUMBIA.

JOINT.

Application filed November 11, 1927. Serial No. 232,658.

In its broader aspects my invention relates to means for securing an end portion of any flexible member to another member, while more specifically and in particular it relates to means for securing an end of a flexible electrical conductor such as a "pig tail" to another electrical conductor such as a motor brush.

As is well known, motor brushes in use are subjected to constant vibration and changes in temperature, and due to these adverse conditions of their use it has long been a problem to provide means to maintain flexible electrical conductors, "pig tails", in firm electrical connection with them. Many different schemes have been proposed for the purpose, but so far as I am aware no one of them has proven entirely satisfactory. It is, therefore, my purpose, generally speaking, to provide means for securing an end portion of a flexible member to another member in such manner that the two members are practically incapable of accidental separation and that a firm contact is maintained between them irrespective of vibrations, changes in temperature or other adverse conditions to which either or both of them may be subjected in use.

More particularly it is my purpose to provide means for securing a flexible member to another member, which means will have a constant tendency to expand and by such tendency will serve to maintain the two members constantly in firm engagement with one another.

In the accompanying drawings which are illustrative of certain specific embodiments of my broad inventive idea, and wherein like characters of reference denote corresponding parts in related views:—

Fig. 1 is a view partly in elevation and partly in section showing the first step in producing a connection between a "pig tail" and a motor brush in accordance with one specific form of my invention;

Fig. 2, a view similar to Fig. 1 showing the second and final step in producing a connection in accordance with this form of my invention;

Fig. 3, a view similar to Fig. 1 showing still another manner of a flexible member to another member in accordance with my invention;

Fig. 4, a perspective view of the expansible securing member employed in the form of my invention illustrated in Figs. 1, 2 and 3;

Referring to the drawings in detail, particularly to Figs. 1 and 2, 10 designates a motor brush or other member to which is adapted to be secured one end of a flexible member such, for example, as a "pig tail" 12, a common form of the latter consisting of numerous strands of small gauge wire twisted together.

In accordance with the form of my invention illustrated in Figures 1 and 2 a hole 14, preferably of a size to neatly yet freely receive one end of the flexible member 12, is drilled at any desired point to a suitable depth into the member 10 and another hole 16, preferably somewhat larger in diameter than the hole 14, then is drilled into said member at or substantially at right angles to the hole 14, so as to intersect the latter at a point intermediate its ends and to extend at least a short distance therebeyond. One end of the flexible member 12 then is inserted into the hole 14 until it extends beyond the intersecting hole 16. A wad of metallic wool or other material 18, preferably of elongated shape as shown in Fig. 4, consisting of promiscuously intermingled, inherently resilient strands of conductive material of indefinite shape and length whereby it has a constant tendency to swell or expand when compressed, then is inserted into the hole 16 into contact with the flexible member 12 and by any suitable implement is pressed or hammered against said flexible element with sufficient force to cause the same to be driven laterally into the hole 16 and to assume a substantially U or V-shape, the material 18 filling the space between the arms resulting from the U or V-bend and at the same time being compressed into a relatively solid yet expansible mass whereby the flexible member 12 is prevented from straightening out and thus is maintained interlocked with the member 10, and whereby a firm contact is maintained between said members 10, 12 due to the constant tendency of the material 18 to swell or expand and to force the arms of the U or V-bend against the wall of hole 16.

I have found in practice that a short length of the same material as that constituting the flexible member 12 serves admirably the purpose of the member 18, although it is preferred to form said member from metallic wool, preferably bronze wool, as it is believed the latter may be more intimately compressed by less force than is required to compress a short length of the same material as that of the member 12 and that when compressed, metallic wool, particularly bronze wool, will have more elasticity or tendency to swell or expand than the material from which the member 12 is formed. I would point out in this connection, however, that my inventive idea as previously stated, and what I believe is entirely new and extremely beneficial, is to provide means for securing the member 12 to the member 10, which means will have a constant tendency to expand and by such tendency will serve to maintain the two members constantly in firm engagement with one another, and under such conditions it is immaterial what the composition of the member 18 may be so long as it possesses the characteristics mentioned.

In practice I have found that a connection produced in accordance with my invention as outlined in the foregoing remains firm at all times despite the severest vibrations and changes in temperature to which the members 10, 12 may be subjected, and this is due entirely, I believe, to the elastic nature of the member 18 whereby it is compressible when the members 10, 12 expand as a result of rising temperatures and is expansible when the members 10, 12 shrink or contract as a result of lowering temperatures.

While a joint produced in accordance with the disclosures in Figs. 1 and 2 is desirable, manifestly it is not essential according to my inventive concept to bend the member 12 to U-shape or to any other irregular form, as the advantage of maintaining a firm connection between the members 10, 12 by means of an expansible member may be had simply by drilling a single hole into the member 10, inserting one end of the flexible member 12 therein and then forcing one of the members 18 into said hole alongside of the member 12, all as clearly shown in Fig. 4 of the drawings, the member 18 being compressed when forced into the hole and by its resultant constant tendency to expand serving to bind the member 12 against the wall of the hole thus to retain the member 12 in said hole and to maintain a constant firm contact between said members 10 and 12.

While I have described my invention as used for connecting a "pig tail" with a motor brush, it is manifest that either of the different structural embodiments thereof may be used for securing a flexible member of any type to any other member, and furthermore, while I have herein illustrated and described certain specific embodiments of my invention, I desire it understood that I restrict myself thereto only in so far as may be imported from the terms of the appended claims.

I claim:

1. A member having a hole therein, a flexible member having an end portion thereof engaged in said hole, and compressible means consisting of a wad of promiscuously intermingled inherently resilient strands of conductive material of indefinite shape and length having a constant tendency to expand when compressed, compressed in said hole against said flexible member and acting through its constant tendency to expand to maintain said flexible member firmly connected with said first mentioned member.

2. A member having a hole therein, a flexible member having an end portion thereof engaged in said hole, and a wad of metallic wool having a constant tendency to expand when compressed, compressed in said hole against said member and acting through its constant tendency to expand to maintain said flexible member firmly connected with said first mentioned member.

In testimony whereof I hereunto affix my signature.

WALTER BAILEY.